…

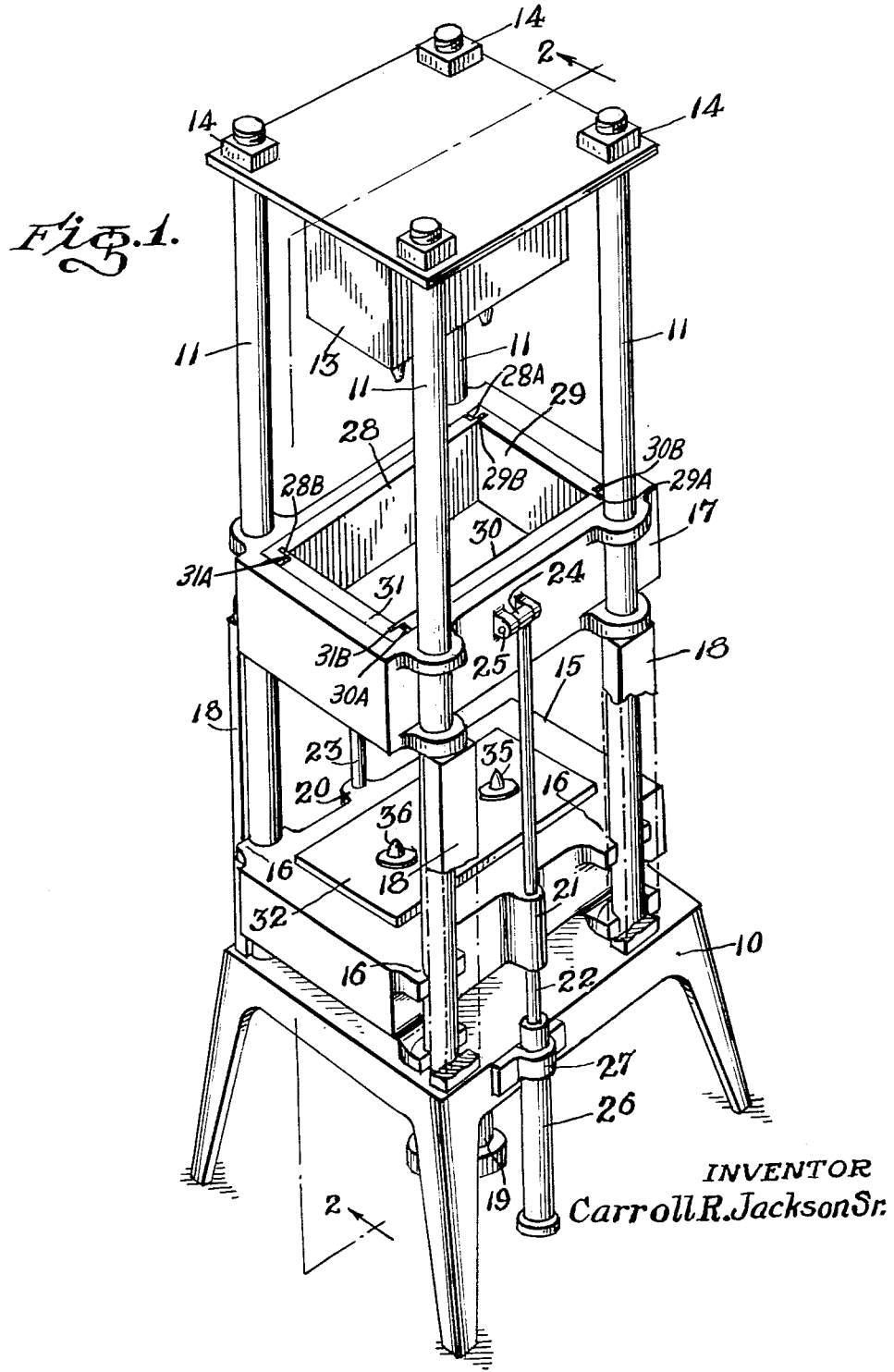

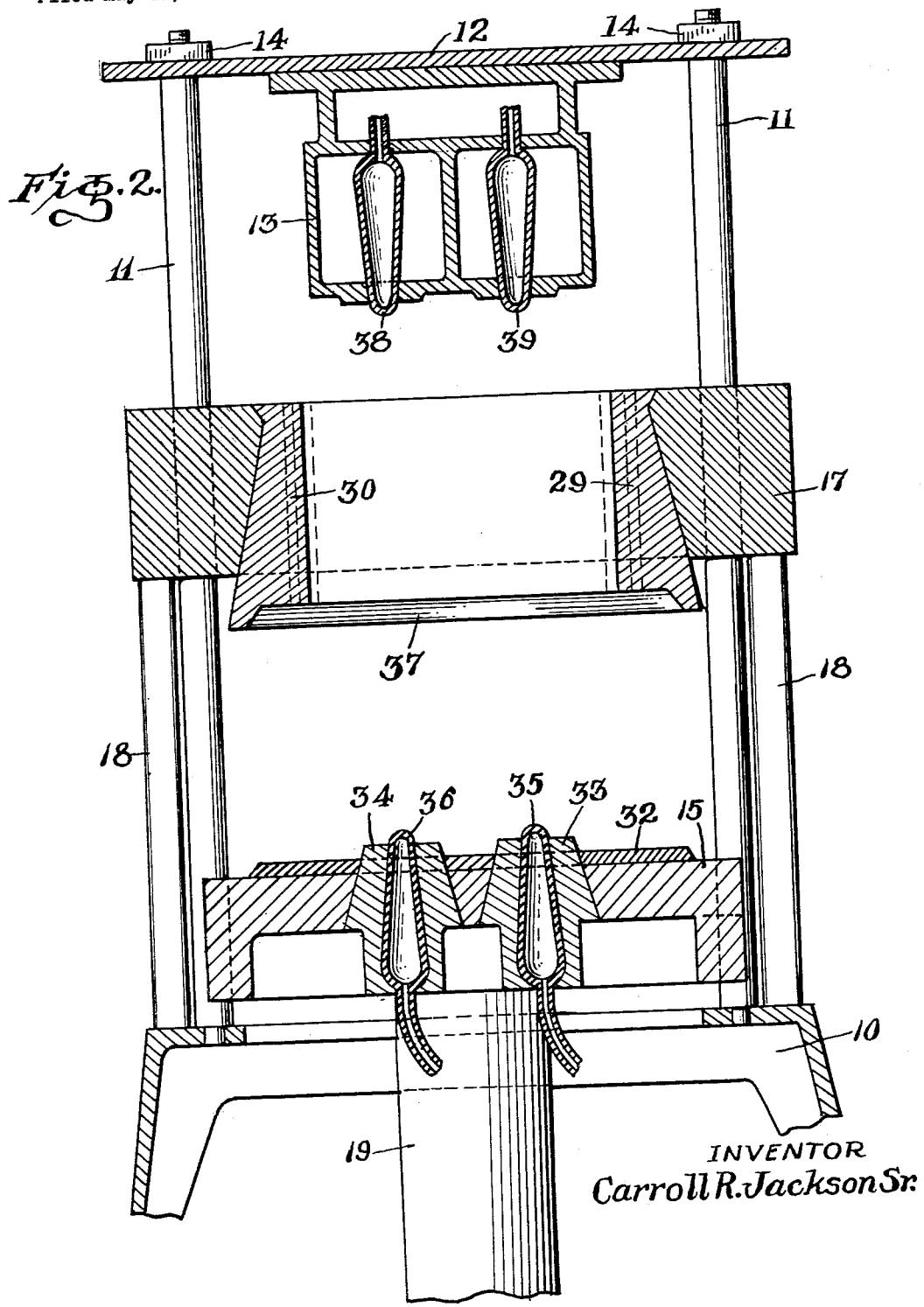

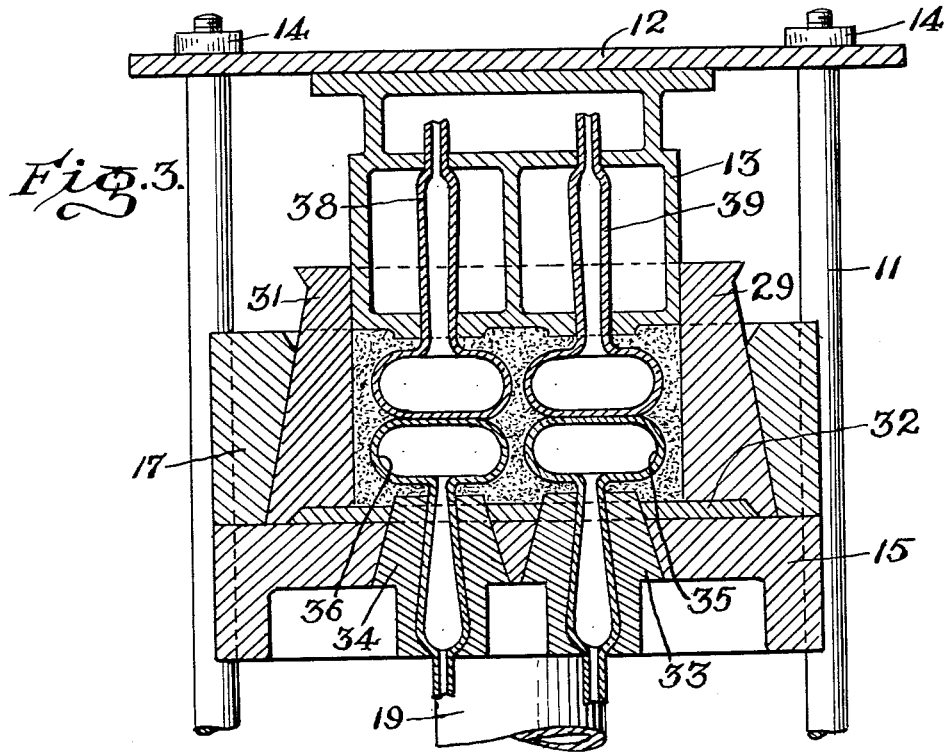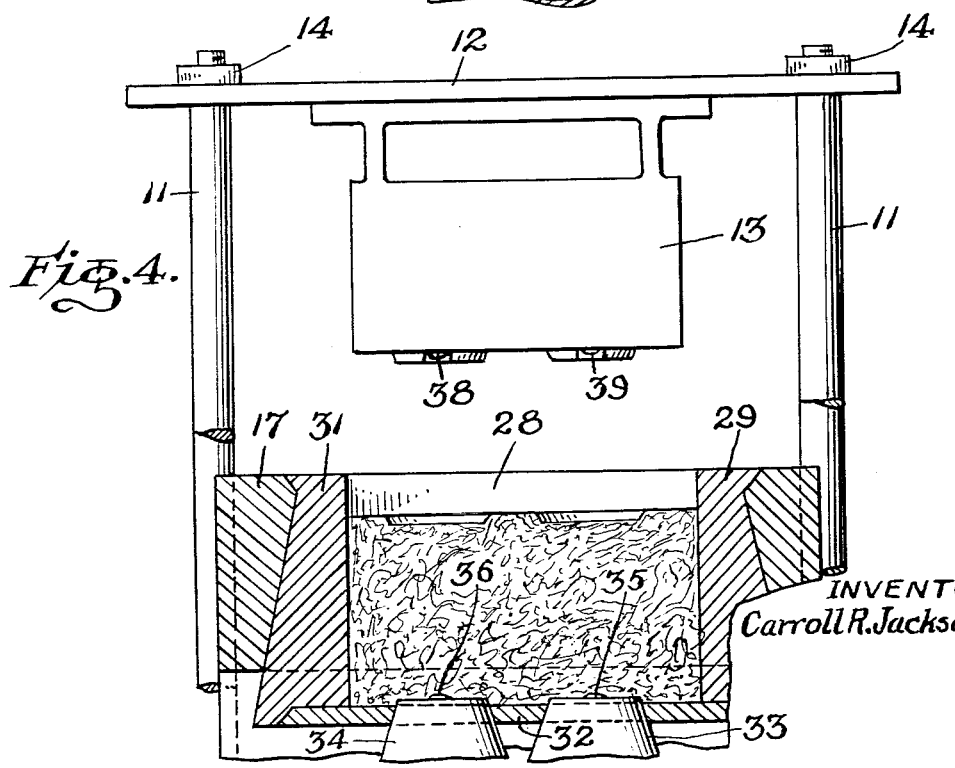

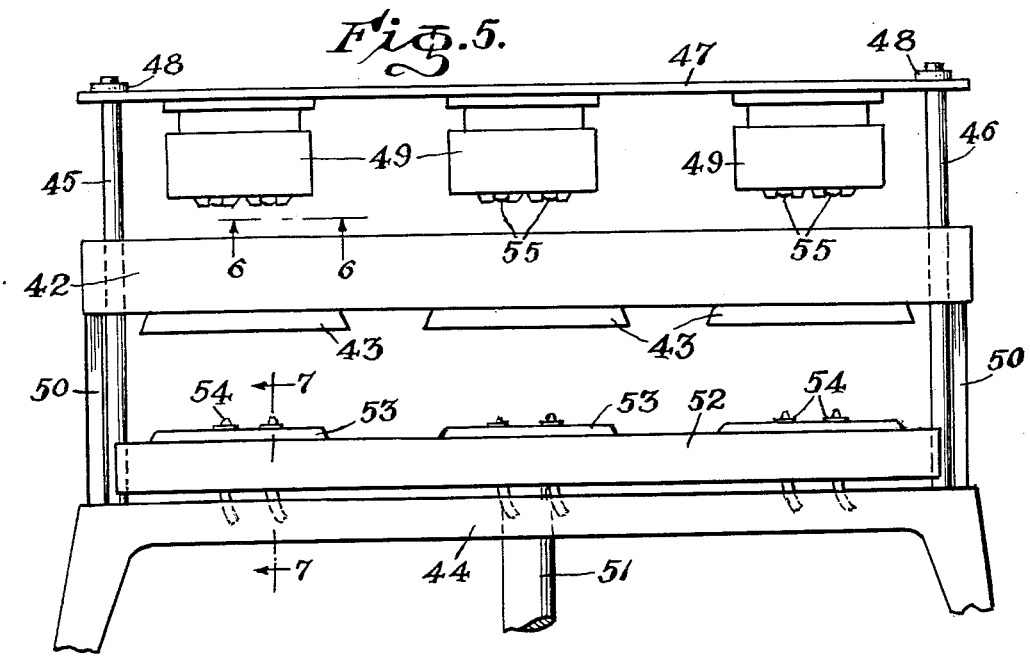

United States Patent Office 3,153,833
Patented Oct. 27, 1964

3,153,833
BLOCK MAKING MACHINE
Carroll R. Jackson, Sr., Suite 2, 1801 Charles Road, Cleveland 12, Ohio, assignor of one-tenth to P. A. Mackin, Cleveland, Ohio
Filed May 19, 1959, Ser. No. 814,189
5 Claims. (Cl. 25—41)

This invention relates to a machine for forming building blocks.

It is the principal object of the present invention to provide a machine for preparing building blocks in which the dead air space within the blocks is formed during the molding operation by an expandible rubber or bellows disposed interiorly of the molding material and while the moldable material is held in a confined space defined by a chamber closed upon the material to a predetermined size.

It is another object of the invention to provide a machine for forming building blocks in which the cement material is added to the mold in a predetermined and measured amount after the bottom of the mold carrying the bottom bellows has been closed and just prior to the placing of the top die also containing expandible bellows and such that the bellows upon being inflated fully compresses the cement mass against the sides of the mold and in which the sides of the mold are simultaneously squeezed inwardly by the upward movement of the bottom of the mold and against the sides of the fixed outer structure, the mold being a four piece interfitted one adapted to be reduced in size by the wedging action of the mold piece within the mold as the continued upward movement of the bottom and the mold is effected to finally bring the mold against the upper die.

Other objects of the invention are to provide a machine for forming building blocks with dead air spaces in them, having the above objects in mind, which can be easily carried out, the machine being of simple construction and easy to operate, the steps of the forming of the building blocks being kept to a minimum and the machine being easily operated and being efficient and automatic in operation.

For a better understanding of the invention, reference may be had to the following detailed description taken in connection with the accompanying drawing, in which FIGURE 1 is an isometric view of the building block machine with portions broken away to more clearly show the construction thereof, FIG. 2 is an enlarged fragmentary vertical sectional view taken generally on line 2—2 of FIG. 1, FIG. 3 is a vertical sectional view showing the block in its final stages of being formed with the bellows upon the bottom and top die being expanded and united to provide the dead air space and the four pieces mold elements being fully compressed, FIG. 4 is a fragmentary vertical elevational view of the mold with the completed block having been lowered from the top die and the bellows of the top die and the bottom having been deflated out of the block, FIG. 5 is a fragmentary elevational view of a machine from which three building blocks can be made at a time with the same operations, FIG. 6 is a fragmentary bottom plan view of one side of the top die as viewed on line 6—6 of FIG. 5, and FIG. 7 is an enlarged vertical sectional view taken through one of the bellow devices in the bottom structure and as viewed on line 7—7 of FIG. 5.

Referring now to the figures, 10 represents a four-legged base having four columns 11 secured at the corners thereof and to the upper end of which there is secured a top plate 12 bearing a top die 13. The plate 12 is made secure upon the upper ends of the upright columns 11 by securing nuts 14. A bottom die 15 is provided with slide projections 16 through which the columns 11 extend so that in its vertical movement it is guided vertically to close off the underside of a mold 17 that is normally supported at an intermediate elevated position by depending legs 18 engaging with the top of the base support 10. The bottom die 15 is lifted by a hydraulic ram 19 connected to the underside of the bottom die 15 and adapted to be extended through the base plate 10 to lift the bottom die upwardly into engagement with the bottom of the mold 17. On the bottom die 15 are lugs 20 and 21 through which rods 22 and 23 respectively extend and are respectively connected between pairs of lugs 24 and a pin 25 to the sides of the mold 17. The lower ends of the rods 22 and 23 are extended into cushioning cylinders 26 which are secured by straps 27 to the sides of the base 10. In this manner the upward movement of the mold 17 is resiliently restrained as the bottom die 15 engages the same so that a good connection will be effected between the same before the bottom die and the mold are carried upwardly to receive the top die 13 and to complete the molding operation.

The mold 17 carries four interfitted mold inserts 28, 29, 30 and 31 which are tapered on their outer sides and which engage with inclined faces of the mold 17 proper as best shown in FIG. 2 so that as the bottom die continues with its upper movement the pieces are compressed against the cement material which will have been disposed in the mold 17 after the bottom die has been lifted to close the underside of the same. The bottom die has a pallet 32 on the top face thereof upwardly through which bellows retainers 33 and 34 have respectively expandible bellows 35 and 36 extending. The internal mold pieces 28, 29, 30 and 31 are recessed on their undersides as indicated at 37 to receive the pallet 32 which will engage with the undersides of the mold pieces to close off the bottom thereof and to follow upwardly therewith when the mold 17 is being elevated for engagement with the top die 13. There is an interruption in the lifting of the ram after the bottom of the mold 17 has been closed by the bottom die 15 in order that the cement material can be poured into the open top of the mold 17. The top die has expandible bellows 38 and 39 depending into the top of the mold pieces as the bottom die and the mold 17 are finally lifted in the manner best shown in FIG. 3 and prior to the inflation of the several bellows of the bottom and top dies. As soon as the mold 17 has been fully elevated by the bottom die 15 and the mold pieces have been completely squeezed to provide the final external shape of the block, the bottom and top bellows are inflated and will assume a shape such as shown in FIG. 3 to form the interior or dead air space of the block. Small openings will be provided on the top and bottom faces of the block and upon deflating the bellows they can be removed through these small openings. The mold and the bottom die is then returned to their original positions and made ready to form another block.

The four mold pieces 28, 29, 30, and 31 are interlocked in a novel manner to provide a fully enclosed side wall structure in any selected position of elevation with respect to the inclined faces of mold 17. This interlock construction is best seen in FIGURE 1. Member 31 has a side flange 31A which interfits with a slot 28B of member 28. Member 28 has a like side flange 28A interfitting with a slot 29B of member 29. Member 29 is provided with flange 29A interfitting a slot 30B of member 30, and member 30 has a flange 30A fitted into slot 31B of member 30. The flanges are of sufficient length to fit their respective slots when the members are fully retracted, but the full dimension portion is short enough to prevent the resultant end shoulder from fully contacting the adjacent members at least until the members are fully elevated. Thus, as the members are elevated in mold 17, they will each slide sideways as they move inwardly, and at all times maintain a fully interlocked relationship which will be closed with respect to ability to hold a charge of relatively dry block making mix.

Further, such interlocked structure may be stopped at any desired elevational position to thereby establish any desired physical size for a resultant block within the range of the interlock walls. Hence, by the provision of a preselected size top member 13, and suitable stops, blocks of very close size tolerance, but of variable range, may be produced. Because the change of material will be less than the cavity produced by the closed members, in order that the bellows members may expand and define spaces in the resultant block, the closing members do not act so much as compression members in the sense of closing down upon a charge, as they act as selectably positionable walls which will resist expansion forces from within. It is, of course, possible to provide an exact measure of material and hence produce a compressed block having no internal bellows-produced cavity.

In FIGS. 5, 6 and 7 there is shown a block forming machine having a single mold piece 42 of sufficient length to carry three sets of internal mold pieces 43. A base 44 is provided from which there extends upwardly columns 45 and 46 that are held together at their upper ends by a top plate 47 that is made secure to the columns by nuts 48. Top dies 49 depend from the top plate 47. The triple mold is supported on legs 50 on the base 44. A hydraulic ram 51 elevates the bottom die 52 having pallets 53 adapted to enter the mold piece 43 and bellows 54. In the top dies 49 are bellows 55 that depend through a bellows retaining member 56. The bellows 54, as shown in FIG. 7, is held between the retainer member 56 and an internal tapered fitting 57 over a nozzle 58. The member 57 depends through the bottom of the die and is held against upwardly displacement by a nut 59 threaded onto the depending end of the member 54. A hose 61 is connected to a tube 62 which runs upwardly into the nozzle 58. Air under pressure is passed into the nozzle 58 and through the perforated end thereof to expand the bellows 55.

This multiple machine will work in the same manner as the single machine. The bottom die 52 will be elevated for engagement with the mold piece 43 of the mold 42. The bottom die 52 and the mold 42 after the same has been filled with cement will be elevated into engagement with the top dies 49. Thereafter the bellows are inflated to form the interior or dead air space of the block. With this machine three blocks are formed.

It should be apparent that there has been provided a new machine for forming building blocks with dead air space and that the machine can be easily operated and is of simple construction.

While various changes may be made in the detailed construction, it shall be understood that such changes shall be within the spirit and scope of the present invention as defined by the appended claims.

What is claimed is:

1. A block making machine comprising a base, columns extending upwardly from the base, a bottom die disposed slidable upon the columns and means for lifting said bottom die, a mold also slidable upon the columns, and means for supporting said mold above the bottom die, said mold having four cam side members with four cam following insert wall members, said wall members being vertically movable with respect to said cam side members to produce a retractable perimeter mold wall, said wall members having an interlock construction wherein each wall member has a side flange mated into a slot in the adjacent side member said bottom die being engageable with the bottom edges of said four insert wall members of the mold to enclose the bottom of the same, a top die on the upper ends of the columns and engageable with the mold to close the same upon the walls being elevated with respect to said cam side members and the entire mold being elevated by the bottom die, the mold in its intermediate position being adapted to receive cement material when closed by the bottom die and prior to its engagement with the upper die, and at least one of said dies having bellows adapted to be expanded into the cement material to provide the dead air space openings therein.

2. A block making machine comprising a base, columns extending upwardly from the base, a bottom die disposed slidable upon the columns and means for lifting said bottom die, a mold also slidable upon the columns, and means for supporting said mold above the bottom die, said mold having four cam side members with four cam following insert wall members, said wall members being vertically movable with respect to said cam side members to produce a retractable perimeter mold wall, said wall members having an interlock construction wherein each wall member has a side flange mated into a slot in the adjacent side member said bottom die being engageable with the bottom edges of said four wall members of the mold to enclose the bottom of the same, a top die on the upper ends of the columns and engageable with the mold to close the same upon the walls being elevated with respect to said cam side members and the entire mold being elevated by the bottom die, the mold in its intermediate position being adapted to receive cement material when closed by the bottom die and prior to its engagement with the upper die, each of said dies having corresponding pairs of bellows associated therewith and adapted to be inflated to form the dead air space in the block.

3. A block making machine as defined in claim including a cushioning cylinder carried on the mold to maintain the mold against the bottom die as the bottom die and the mold are being elevated into engagement with the top die and to aid in the disengagement of the mold from the top die.

4. A block making machine comprising a base, columns extending upwardly from said base, a top die carried by upper portions of said columns, a bottom die slidable upon said columns toward and away from said top die, means for raising and lowering said bottom die, a mold normally positioned at an intermediate elevated position between said top and bottom dies by depending legs engaging said base, said mold being slidable on said columns between said normal position and an engaging position with said top die, said mold including four side walls having upwardly and inwardly inclined cam faces, four mold inserts having tapered outer faces corresponding with and slidably engaging said cam faces, each of said mold inserts having at one end a slot in its inner face and a flange extending from its other end into slidable engagement with the slot in the adjacent insert when said mold is in said normal position, said bottom die being engageable with the bottom edges of said inserts when said mold is in its normal position so that elevation of said bottom die will move said inserts upwardly relative to said side walls and toward each other and then will raise said mold into said engaging position whereby a confined molding chamber is defined by said dies and said inserts, and means carried by said dies for compressing a molding material in said molding chamber.

5. The apparatus as claimed in claim 4 wherein said compressing means comprises an inflatable, tubular bag carried by each die, each of said bags having an end portion extending through a confining hole in its respective die toward the other bag, said bag portions being disposed within said molding chamber in end engagement when the mold is in said engaging position, said bag portions being laterally expandable within said chamber when said bags are inflated.

References Cited in the file of this patent

UNITED STATES PATENTS

| | | |
|---|---|---|
| 1,017,876 | Landis | Feb. 20, 1912 |
| 1,433,204 | Hodges | Oct. 24, 1922 |
| 1,919,070 | McKay et al. | July 18, 1933 |
| 2,289,698 | Davis | July 14, 1942 |
| 2,358,765 | Stadlin | Sept. 19, 1944 |
| 2,542,874 | Locatelli | Feb. 20, 1951 |
| 2,595,286 | Otte et al. | May 6, 1952 |
| 2,729,871 | Locatelli | Jan. 10, 1956 |
| 2,741,007 | Locatelli | Apr. 10, 1956 |
| 2,875,499 | Ross | Mar. 3, 1959 |

FOREIGN PATENTS

| | | |
|---|---|---|
| 77,474 | Germany | Oct. 9, 1894 |
| 314,453 | Italy | Jan. 27, 1934 |
| 439,252 | Great Britain | Dec. 3, 1935 |